July 14, 1936.  J. DOLZA  2,047,771
BODY STABILIZER
Filed Sept. 15, 1934
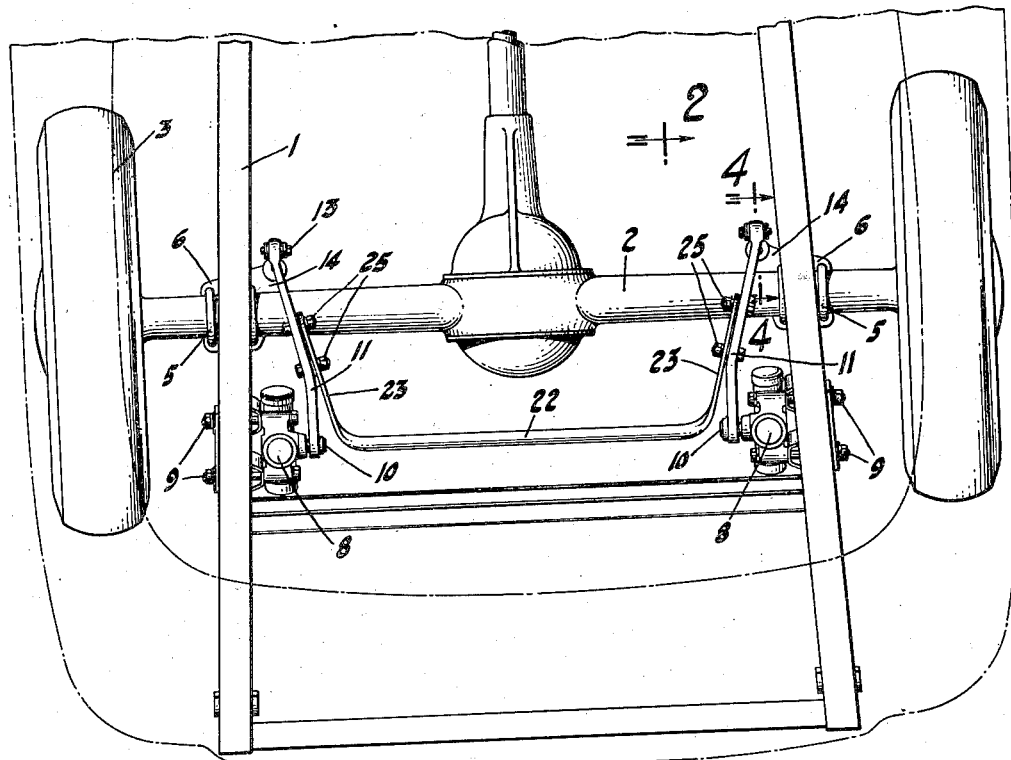
Fig. 1
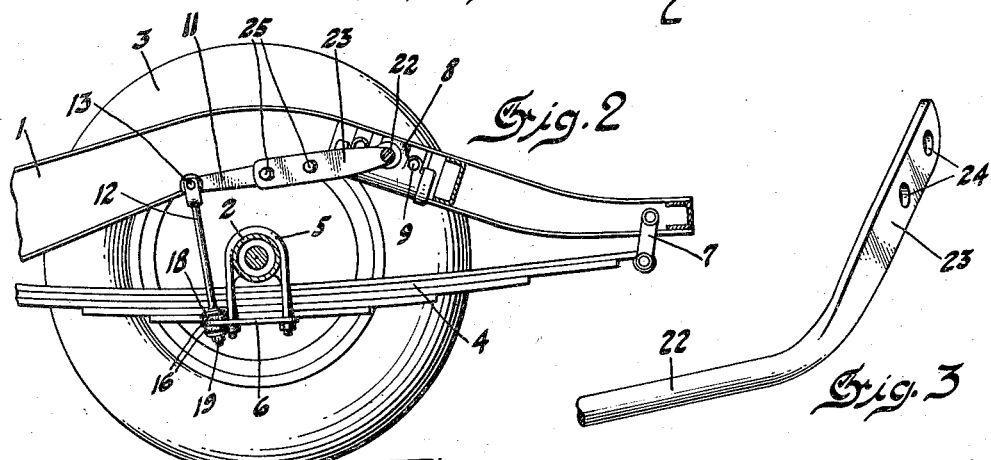
Fig. 2
Fig. 3
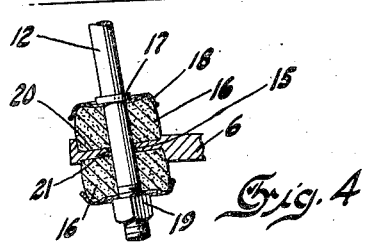
Fig. 4
Inventor
John Dolza
By Blackmore, Spencer & Flint
Attorneys Patented July 14, 1936

2,047,771

UNITED STATES PATENT OFFICE 2,047,771

BODY STABILIZER

John Dolza, Flint, Mich., assignor to General Motors Corporation, Flint, Mich., a corporation of Delaware Application September 15, 1934, Serial No. 744,142

6 Claims. (Cl. 267—11)

The present invention relates to apparatus for minimizing or preventing body roll in motor cars. More specifically, it relates to a stabilizing member which extends between the two shock absorbers on opposite sides of the car to transmit the motion of one to the other.

With the present use of different types of wheel suspension and especially with independent front wheel suspension in motor cars, the springing of the body is softer or more flexible. However, in these cases, a decided body roll or list was present when the car turned curves or went around corners.

It is an object of my invention to provide means to counteract the roll with only a slight change in the existing structure of the car.

It is a further object of my invention to provide means to counteract the roll without undue strain or binding on the shock absorber bearing.

With these and other objects in view, my invention resides in the construction as set forth in the specification, claimed in the claims and illustrated in the accompanying drawing, in which:

Figure 1 is a top plan view of the rear section of an automobile chassis with my invention applied thereto.

Figure 2 is a sectional view taken on the line 2—2 of Figure 1.

Figure 3 is an enlarged detail view of one end of my bracing rod.

Figure 4 is a sectional view taken on the line 4—4 of Figure 1.

A chassis frame 1 is supported on a rear axle 2 and wheels 3 by a conventional semi-elliptic spring 4 which is connected to the axle by U-bolts 5 and a clamping plate 6 at its center. The outer ends of the springs are connected to the frame by shackles 7.

Secured to the frame to the rear of the axle are two shock absorbers 8 by a series of nuts and bolts 9. The shafts 10 of the shock absorbers project toward the center of the car and carry arms 11 at right angles thereto substantially parallel with the side frame members. To the outer ends of the arms 11 are pivotally secured vertical rods 12 by suitable pin connections 13.

The clamping plates 6 through which the arms of the U bolts project to clamp the axle to the springs are substantially rectangular, but have a projecting ear 14 having a hole 15 therein. The axis of the hole 15 is not at right angles to the faces of the plate, but is tilted a small amount as best shown in Figure 4. The rods 12 project through the holes 15 and carry two rubber biscuits 16, one on each side of the plate. The portion of the rod just above the plate has raised circumferential ridge 17 below which is a dished metal washer 18 to fit around the rod whose outer edges surround the biscuit, and which abuts the ridge. The washer and ridge prevent the biscuit from moving axially up the rod. The lower end of the rod which projects through the plate is threaded and also has a rubber biscuit and metal washer held thereon by a nut 19, which forces the biscuit up against the plate. The surfaces of the plate adjacent the hole are counter bored to the diameter of the biscuits and on the axis of the hole to provide surfaces 20 parallel to the bases of the biscuits. The inside bore of the hole is rounded as at 21 so that the rod may pivot through the hole as allowed by the rubber biscuits.

A long U shaped rod 22 having its end arms flattened as at 23 to give flexibility thereto and two holes 24 drilled in each, is secured by the two arms to the opposite shock absorber arms 11 by nuts and bolts 25. The axis of the transverse rod section is coincidental to that of the axes of the shock absorber shafts, the arms then being bent parallel to a portion of the shock absorber arms and secured thereto. This long U shaped rod is termed the stabilizer.

Since the stress of the rod 22 is applied to the shock absorber arms at a distance from the shaft, and at an angle thereto, there is some thrust on the shaft which tends to cause binding and excess wear of the shock absorber bearings. In order to reduce this as much as possible, the angled ends of the rod have been flattened as shown at 23 to make the same more flexible in desired planes and decrease the thrust while at the same time not diminishing the force imparted to decrease body roll.

The action of the stabilizer may be briefly described. If the car is driven around a corner to the left, the body (shown in dotted lines in Figure 1) will tend to press down the right-hand frame member due to inertia. This will cause the right-hand shock absorber arm to go up relative to the frame, which of course will carry with it the right-hand arm of the stabilizer. Assuming that the other arm of the stabilizer has not moved, this action will cause a twisting or torsional strain in the rod portion of the stabilizer which will tend to pull the body down in the left side also. If the left side of the car is assumed to rise when the right descends, then the torsional twist upon the rod will be even greater, and this force tends to keep the two shock absorber arms parallel and the body on even keel.

The greater the tendency to roll, the greater will be the torsion in the rod tending to keep the whole upright. Therefore, in turning curves with a stabilizer attachment, the car will settle to a small extent, but will not roll appreciably.

It will therefore be seen that I have provided a simple and efficient stabilizer that may be applied to an assembled car by merely drilling a few holes in the shock absorber arms, and which is so designed that it does not cause binding of the shock absorber shafts.

I claim:

1. A stabilizer for a vehicle frame having semi-elliptic spring suspension on an axle, and shock absorbers having shafts opposite each other on the frame, actuating arms on the shafts, and a rod having flattened angular end portions secured to the arms to transmit the motion of one to the other, the flattened portion giving flexibility and preventing binding of the shafts.

2. A vehicle chassis comprising a frame having spaced longitudinal members and cross members, an axle, a semi-elliptic spring for supporting the frame on the axle, shock absorbers secured to the frame on each of the longitudinal sides having stub shafts projecting therefrom, arms secured to the shafts, rods secured to the arms and to the axle and a transversely disposed rigid member having angularly disposed flattened end portions connected to the two opposite arms whereby rotational movement of one of the arms about its shaft will cause torsional strain in the member tending to move the other arm to the same position.

3. A stabilizer for a vehicle frame having semi-elliptic spring suspension on an axle and shock absorbers opposite each other on the frame, actuating arms for the shock absorbers, a rod having angular flattened end portions extending between the arms and secured thereto whereby movement of one arm is transmitted to the other by the torsional strain in the rod.

4. A stabilizer for eliminating body roll in a vehicle having a frame supported on semi-elliptic springs upon an axle, and shock absorbers on opposite sides of the frame with actuating arms, a member with angular flattened end portions secured to two opposite shock absorber arms whereby movement of one will tend to move the other.

5. Vehicle chassis construction comprising a frame having longitudinal and transverse members, springs for supporting the frame on an axle, shock absorbers having shafts and being secured to the longitudinal frame members, shock absorber arms on the shafts connected to the axle for transmitting motion thereof to the absorber and a member having angular flattened end portions secured to the two opposite arms for transmitting motion of one to the other and preventing binding of the shafts.

6. Vehicle chassis construction comprising a sprung and an unsprung mass, shock absorbers supported in opposed relation on opposite sides of the sprung mass, means connecting each shock absorber to the unsprung mass and a member having flattened angular end portions secured to the last mentioned means for transmitting the motion of one connecting means to the other.

JOHN DOLZA.